United States Patent
Sgambati et al.

(12)

(10) Patent No.: US 10,346,620 B2
(45) Date of Patent: Jul. 9, 2019

(54) SYSTEMS AND METHODS FOR AUTHENTICATION OF ACCESS BASED ON MULTI-DATA SOURCE INFORMATION

(71) Applicant: Early Warning Services, LLC, Scottsdale, AZ (US)

(72) Inventors: Glen Sgambati, Glendale, AZ (US); Robert Perrotta, Scottsdale, AZ (US); Rich Mayo, Cave Creek, AZ (US)

(73) Assignee: Early Warning Service, LLC, Scottsdale, AZ (US)

( * ) Notice: Subject to any disclaimer, the term of this patent is extended or adjusted under 35 U.S.C. 154(b) by 0 days.

(21) Appl. No.: 15/840,978

(22) Filed: Dec. 13, 2017

(65) Prior Publication Data

US 2018/0157851 A1    Jun. 7, 2018

Related U.S. Application Data

(63) Continuation-in-part of application No. 10/773,642, filed on Feb. 6, 2004.

(51) Int. Cl.
*H04L 9/32* (2006.01)
*G06F 21/60* (2013.01)
(Continued)

(52) U.S. Cl.
CPC ............ *G06F 21/602* (2013.01); *G06F 16/17* (2019.01); *G06F 16/2365* (2019.01); *G06F 21/44* (2013.01)

(58) Field of Classification Search
CPC combination set(s) only.
See application file for complete search history.

(56) References Cited

U.S. PATENT DOCUMENTS 4,109,238 A * 8/1978 Creekmore ............ G06Q 20/04
235/379
5,175,682 A    12/1992 Higashiyama et al.
(Continued)

FOREIGN PATENT DOCUMENTS

WO    2005/076855 A2    8/2005

OTHER PUBLICATIONS

Canadian Patent Application No. 2,555,265, "Office Action", dated Mar. 5, 2014 ; 3 pages.
(Continued)

*Primary Examiner* — Phy Anh T Vu
(74) *Attorney, Agent, or Firm* — Kilpatrick Townsend & Stockton LLP (57) ABSTRACT

An authentication method includes receiving a single electronic file of member data elements from multiple member data sources. The method can include extracting the member data elements from the single electronic file, populating an authentication database with the member data elements, and periodically receiving an update of the member data elements. The update can be used to refresh the authentication database. The method can include receiving non-member data elements from multiple non-member data sources, and updating the authentication database with the non-member data elements. The method can further include receiving a request for authentication for one or more queried data elements corresponding to a supplied identification data element. The method can include determining an authentication response for each of the queried data elements based on the authentication database. The method can further include transmitting the authentication response for each of the queried data elements to the requesting system.

13 Claims, 6 Drawing Sheets

(51) Int. Cl.
*G06F 21/44* (2013.01)
*G06F 16/17* (2019.01)
*G06F 16/23* (2019.01)

(56) References Cited

U.S. PATENT DOCUMENTS

| | | | |
|---|---|---|---|
| 5,265,007 | A | 11/1993 | Barnhard et al. |
| 5,404,488 | A | 4/1995 | Kerrigan |
| 5,679,938 | A | 10/1997 | Templeton et al. |
| 5,679,940 | A | 10/1997 | Templeton et al. |
| 5,819,236 | A | 10/1998 | Josephson |
| 5,832,463 | A | 11/1998 | Funk |
| 5,832,464 | A | 11/1998 | Houvener |
| 6,119,103 | A | 9/2000 | Basch |
| 6,189,785 | B1 | 2/2001 | Lowery |
| 6,351,735 | B1 | 2/2002 | Deaton |
| 6,629,081 | B1 | 9/2003 | Cornelius et al. |
| 6,754,640 | B2 | 6/2004 | Bozeman |
| 7,004,382 | B2 | 2/2006 | Sandru |
| 7,069,250 | B2* | 6/2006 | Meadow ............... G06Q 20/04 380/54 |
| 7,177,846 | B2 | 2/2007 | Moenickheim et al. |
| 7,337,953 | B2 | 3/2008 | Sgambati et al. |
| 7,383,227 | B2 | 6/2008 | Weinflash |
| 7,664,705 | B2 | 2/2010 | Walker et al. |
| 7,945,511 | B2 | 5/2011 | O'Brien et al. |
| 9,235,620 | B2* | 1/2016 | Ciabrini ............ G06F 16/24552 |
| 2002/0002536 | A1 | 1/2002 | Braco |
| 2002/0019827 | A1 | 2/2002 | Shiman et al. |
| 2002/0026396 | A1 | 2/2002 | Dent et al. |
| 2002/0052852 | A1* | 5/2002 | Bozeman ............... G06Q 20/04 705/64 |
| 2002/0065784 | A1 | 5/2002 | Ranzini et al. |
| 2002/0103756 | A1 | 8/2002 | Andrews |
| 2002/0116308 | A1* | 8/2002 | Cunningham ......... G06Q 40/00 705/35 |
| 2002/0120846 | A1 | 8/2002 | Stewart et al. |
| 2002/0138351 | A1 | 9/2002 | Houvener et al. |
| 2003/0018715 | A1* | 1/2003 | O'Neill ................. H04L 12/185 709/204 |
| 2003/0050986 | A1 | 3/2003 | Matthews et al. |
| 2003/0055783 | A1 | 3/2003 | Cataline et al. |
| 2003/0115189 | A1 | 6/2003 | Srinivasa et al. |
| 2003/0115470 | A1 | 6/2003 | Cousins et al. |
| 2003/0130919 | A1 | 7/2003 | Templeton |
| 2003/0217003 | A1* | 11/2003 | Weinflash ............ G06Q 20/042 705/42 |
| 2004/0153514 | A1 | 8/2004 | Crane |
| 2004/0236688 | A1 | 11/2004 | Bozeman |
| 2005/0125360 | A1 | 6/2005 | Tidwell et al. |
| 2005/0211763 | A1 | 9/2005 | Sgambati et al. |
| 2006/0015450 | A1* | 1/2006 | Guck ..................... G06Q 20/10 705/39 |
| 2006/0041930 | A1* | 2/2006 | Hafeman ............ G06F 21/6245 726/2 |
| 2006/0136332 | A1* | 6/2006 | Ziegler .................. G06F 21/31 705/39 |
| 2006/0178954 | A1 | 8/2006 | Thukral et al. |
| 2007/0116268 | A1* | 5/2007 | Kasahara ................ G06F 21/10 380/28 |
| 2014/0181888 | A1* | 6/2014 | Li ........................... G06F 21/62 726/1 |
| 2015/0180894 | A1* | 6/2015 | Sadovsky ............. G06F 3/0481 726/22 |
| 2015/0262170 | A1* | 9/2015 | Bouda ................... G06Q 20/00 705/67 |
| 2018/0189870 | A1* | 7/2018 | Weinflash ............. G06Q 40/02 |

OTHER PUBLICATIONS

Canadian Patent Application No. 2,555,265, "Office Action", dated Jul. 17, 2012; 3 pages.
European Patent Application No. 05712425.7, "Office Action", dated Mar. 13, 2014; 4 pages.
PCT/US2005/002978; "International Search Report and Written Opinion", dated Nov. 7, 2006; 4 pages.
"Secure Seal™—A Product Guide", EnSeal Systems, Ltd., 3 pages, 2003.
U.S. Appl. No. 11/183,167, "Office Action", dated Dec. 11, 2007; 6 pages.
U.S. Appl. No. 10/773,642, "Final Office Action", dated Mar. 12, 2015, 26 pages.
U.S. Appl. No. 10/773,642, "Final Office Action", dated Jan. 30, 2017, 34 pages.
U.S. Appl. No. 10/773,642, "Non-Final Office Action", dated Dec. 20, 2013, 20 pages.
U.S. Appl. No. 10/773,642, "Non-Final Office Action", dated Sep. 12, 2013, 22 pages.
U.S. Appl. No. 10/773,642, "Non-Final Office Action", dated Jul. 15, 2016, 26 pages.
U.S. Appl. No. 10/773,642, "Non-Final Office Action", dated Jul. 17, 2014, 30 pages.
"BB&T, Star Systems and International Check Services Successfully Complete First Safecheck Transactions," News Release dated Aug. 24, 2000, printout date: Mar. 4, 2002, 2 pages, from web site: http://www.intlcheck.com/pages/pressrel20000824.html.
"STAR CHEK Goes Live with Online Check Verification," News Release dated Jan. 16, 2001 Star Systems, Inc., printout from web site: http://www.star-systems.com/cfm/news-press.cfm?id=42 printout date: Feb. 20, 2002, 2 pages.
PPS—Deposit Chek®, "Deposit Chek," printout from web site: http://.64.78.123/dchek.htm Printout date: Mar. 20, 2002, 2 pages.
PPS DEPOSIT CHEK® "Preventing Check Losses at Credit Unions," dated Sep. 20, 2001, 2 pages.
"Financial Institution Letters, Special Alert," dated Mar. 22, 2000 printout from FDIC, web site: http://www.fdic.gov/news/financial/2000/fil0019.html Printout date: Mar. 8, 2002, 1 page.
"Thomson Bank InfoLink™", Thomson Financial Publishing, 2 pages, date unknown.
"EFunds Counts on SAS to Lower Risks for Banks and Retailers," printout from SAS web site: http://www.sas.com/news/success/efunds.html printout date: Mar. 8, 2002, 2 pages.
"About ChexSystems," printout from ChexSystems web site: http://www.chexhelp.com/english/publik/about.htm printout date: Mar. 8, 2002, 1 page.
"ChexSystems and Deluxe Corp.," printout from CardReport web site: http://www.cardreport.com/overview/bureaus/chexsystems.htrr Printout date: Mar. 8, 2002, 3 pages.
"Electronic Clearing House to Power Point-of-Sale Check Service Program," ECHO Press Release dated Jul. 16, 2001, printout from web site: http://www.echo-inc.com/press_115.html Printout date: Mar. 12, 2002, 3 pages.
"TeleCheck® Verification Services," printout from TeleCheck web site: http://www.telecheck.com/products/verification.html Printout date: Mar. 8, 2002, 1 page.
"SCAN[SM] and SCAN Online[SM]", printout from eFUNDS, web site: http://www.efunds.com/us/en/solutions/comp_a2z/pm/001118.cnt Printout date: Mar. 4, 2002, 1 page.
SCAN Consumer Help, Welcome to the SCAN[SM], Consumer Assistance Center, Deposit Payment Protection Services, Inc. copyright date: 1999, printout from web site: http://www.scanassist.com/scanassist.html Printout date: Mar. 8, 2002, 1 page.
CheckAGAIN Product Information, "Centralized Returns." printout from CheckAGAIN, LLC web site: http://www.checkagain.com/returns.asp printout date: Mar. 8, 2002, 1 page.
CheckAGAIN Product Information, "Check Authorizations." printout from CheckAGAIN, LLC web site: http://www.checkagain.com/authorizations.asp Printout date: Mar. 8, 2002, 1 page.
"CheckAGAIN Adds Leading National Authorization Database to Services", News Release dated Jan. 30, 2001, printout from CheckAGAIN, LLC web site: http://www.checkagain.com/press010301.asp Printout date: Mar. 8, 2002, 2 pages.
"CheckAGAIN Adds ECHO's NCIS Database to Service," News Release from ECHO dated Mar. 27, 2001, 1 page.

(56) References Cited

OTHER PUBLICATIONS

"Operation Gold Rush Leads to Arrest of Eight Defendants Charged in Massive Credit Card Scam that Cost Banks up to $15 Million," News release No. 99-038 from Department of Justice, Feb. 23, 1999, 2 pages.

"Compliance with Regulation CC," printout from The Federal Reserve Board web site, http://www.federalreserve.gov/pubs/regcc/regcc/htm Printout date: Apr. 18, 2002, 6 pages.

Welcome to PayByCheck! The leading provider of electronic check processing., printout from PayByCheck web site: http://www.paybycheck.com/ Printout date: Sep. 18, 2003, 2 pages.

"Customized Internet Solutions for Small Business People," printout from web site: http://www.tconsult.com/addressverification.asgx Printout date: Sep. 18, 2003, 3 pages.

"About SCAN$^{SM}$," printout from web site: http://www.scanassist.com/about.html Printout date: Mar. 8, 2002, 1 page.

* cited by examiner

| Inquiry | Response |
|---|---|
| Entity A | |
| Account: 456 | |
| Name: B. Doe | YES |
| Address: 20 East | YES |
| SS#: 987654321 | NO |
| Phone #: 111-222-3333 | NOT AVAILABLE |

MAF

| FILE DATE | FILE ID | Sub ID | ROUTING NO. | ACCT NO. | ACCT TYPE | ACCT STATUS |

HEADER | RECORD DETAIL

TIF

| FILE DATE | FILE ID | Sub ID | ACCT NO. | CHECK STATUS | AMT |

HEADER | RECORD DETAIL

RIF

| FILE DATE | FILE ID | Sub ID | ACCT NO. | CHECK STATUS | AMT | RETURN REASON |

HEADER | RECORD DETAIL

ICF

| FILE DATE | FILE ID | Sub ID | ACCT NO. | CHECK STATUS | AMT | CHANNEL |

HEADER | RECORD DETAIL

SYSTEMS AND METHODS FOR AUTHENTICATION OF ACCESS BASED ON MULTI-DATA SOURCE INFORMATION

CROSS-REFERENCE TO RELATED APPLICATION

This application is a continuation-in-part of U.S. patent application Ser. No. 10/773,642, filed on Feb. 6, 2004, and entitled "Account-owner Verification Database," the entire disclosure of which is hereby incorporated by reference, for all purposes, as if fully set forth herein.

BACKGROUND

Authentication is an integral part of various systems. Obtaining the data necessary for the authentication can be challenging. For example, information may be authenticated based on information from multiple data sources. However, various data sources often include incompatible formatting and encryption. For example, data obtained from files can be unstructured, data obtained from databases can be structured, but stored in fields or formats that are incompatible with each other, and data stored in any location can have varying security measures including encryption, digital signing, and so forth.

With the increased fast access to information on the Internet, efforts to authenticate are needed in real time and with increased accuracy. Exchanges of information are often not face-to-face, making authentication even more critical. Real time, accurate authentication is therefore necessary to help mitigate fraud and other criminal behavior.

Existing authentication services are lacking because they do not provide a robust authentication database. Rather, they are limited to one data source, or do not include information that is not compatibly formatted or compatibly secured. Thus, it would be advantageous to develop authentication methods and systems with sufficient robustness to provide real time, accurate authentication services.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an authentication method, including, for each of multiple member data sources, receive a single electronic file of member data elements from the member data source. The authentication method can also include extracting the member data elements from the single electronic file. The authentication method can also include identifying an encryption format of the member data elements. The authentication method can also include decrypting the member data elements based on the identified encryption format. The authentication method can also include reformatting the member data elements to an authentication database format. The authentication method can also include encrypting the member data elements with an authentication database encryption. The authentication method can also include populating an authentication database of the authentication system with the member data elements, where each of the member data elements from the single electronic file correspond to one of multiple data element fields in the authentication database. The authentication method can also include periodically receiving, at the authentication system, an update of the member data elements. The authentication method can also include refreshing the authentication database of the authentication system with the update of the member data elements. The method can also include, for each of multiple non-member data sources, receiving non-member data elements from the non-member data source. The authentication method can also include updating the authentication database of the authentication system with the non-member data elements, where each of the non-member data elements correspond to one of the multiple data element fields in the authentication database. The authentication method can also include receiving a request for authentication of at least one queried data element corresponding to a supplied identification data element from a requesting system. The authentication method can also include determining, based on the authentication database, an authentication response for each of the queried data elements. The authentication method can also include transmitting the authentication response for each of the queried data elements to the requesting system. Other embodiments of this aspect include corresponding computer systems, apparatus, and computer programs recorded on one or more computer storage devices, each configured to perform the actions of the methods.

Implementations may include one or more of the following features. Optionally, the member data elements are linked to a plurality of accounts maintained at the member data source. Optionally, the member data source is required to provide a member data element for each of a specified set of data element fields for each account. Optionally, the non-member data elements include values obtained from a plurality of check images corresponding to a plurality of checks. Optionally, the authentication response for each of the queried data elements is positive when the queried data element matches a data element value stored in the data element field corresponding to the supplied identification data element, negative when the queried data element does not match the data element value stored in the data element field corresponding to the supplied identification data element, and not available when the data element value is blank for the data element field corresponding to the supplied identification data element. Optionally, the authentication database is structured according to an identification data element field. Optionally, the non-member data elements are noted in the authentication database as from a non-member data source. Optionally, the non-member data elements include analyzed information from non-member data sources. Optionally, the authentication response for one of the queried data elements is negative, and the method can further include determining a supplying data source for the queried data element. The authentication method can also include generating a notification that the authentication response for the queried data element is negative, and transmitting the notification to the supplying data source. Optionally, the authentication response for each of the queried data elements is provided to the requesting system in real time. Implementations of the described techniques may include hardware, a method or process, or computer software on a computer-accessible medium.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

To overcome the above described deficiencies, the description herein provides a solution in the way of systems and methods that facilitate capturing information from disparate data sources, formatting the data to be compatible for use in an authentication database, conform encryption and other security for use in the authentication database, and generate the authentication database that can be used to provide real time accurate authentication services to users.

The data extraction and formatting described herein can allow a new data source to be added to the system automatically by scanning the data, identifying the format, and modelling the data to the new format using models that can be generated using any suitable method including, for example, machine learning. The data can further be filtered before or after reformatting to ensure compatibility with the authentication database. For example, excess data fields can be discarded or filtered out.

Optionally, the authentication database can use machine learning to increase the available information through the filtering process. For example, the authentication system can identify filtered data as a data type and, if the data type is received for various data entries a threshold number of times in a certain period of time, the authentication system can determine that the filtered data type may be useful information. The authentication system can expand the authentication database to utilize the additional data type by, for example, automatically adding an additional data element field and storing the data that corresponds to the additional data element field upon receipt from the various data sources.

Figure 1:
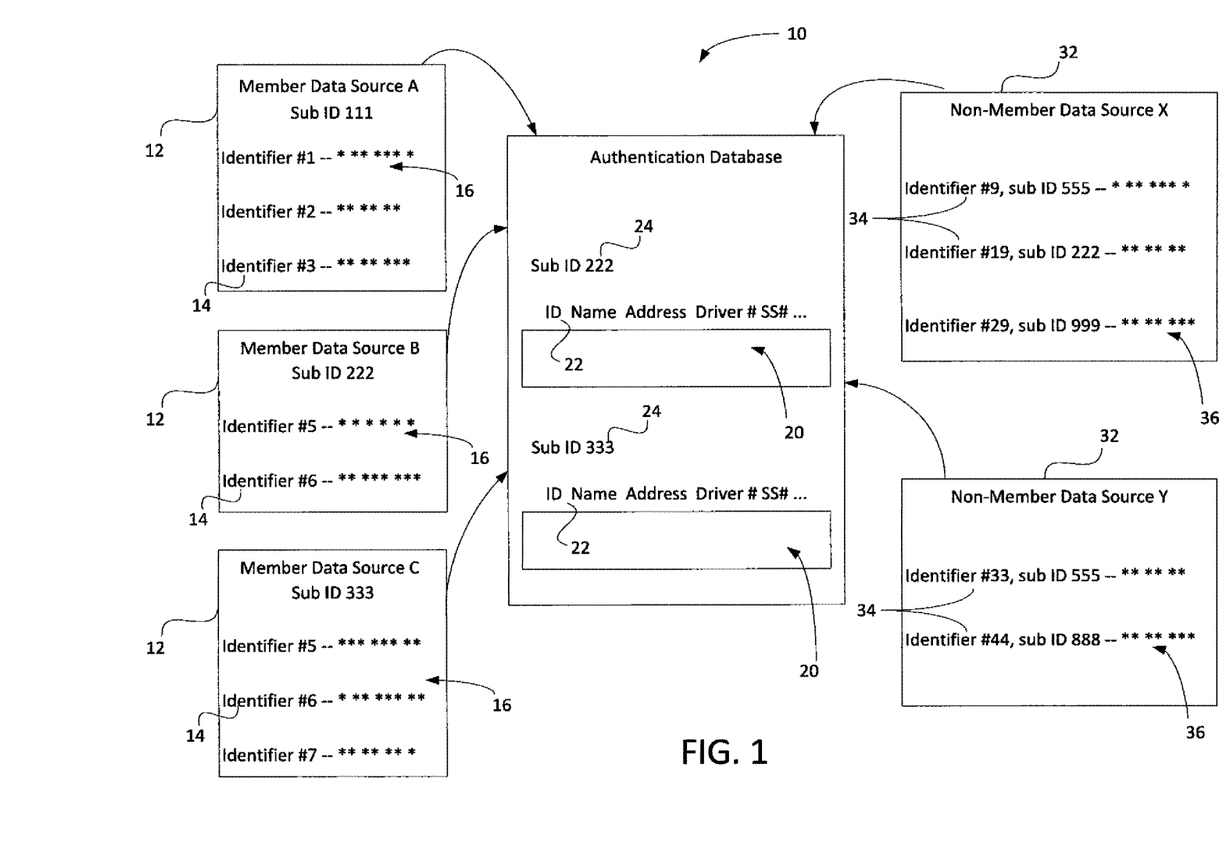
FIG. 1 is a block diagram showing an authentication database and various data sources according to an embodiment.
Figure 2:
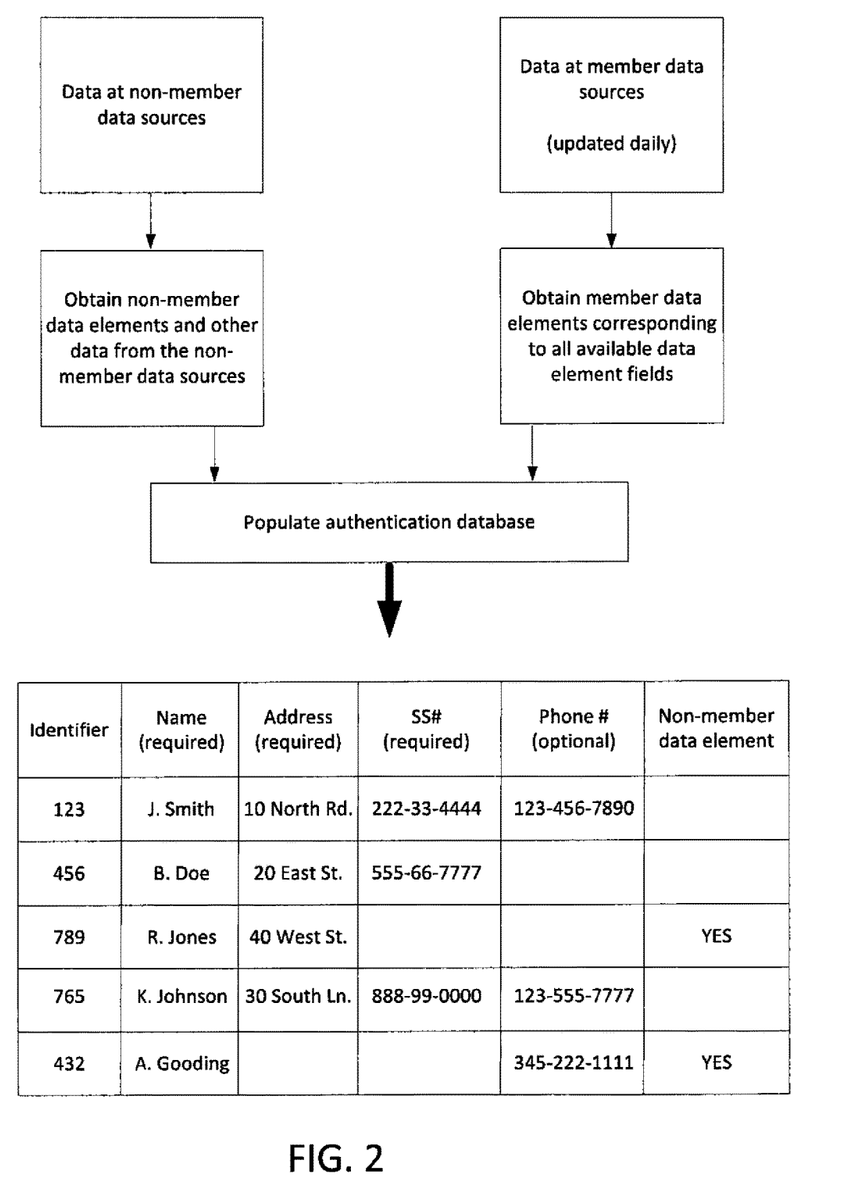
FIG. 2 is a flow diagram showing an example of populating an authentication database according to an embodiment.
Figure 3:
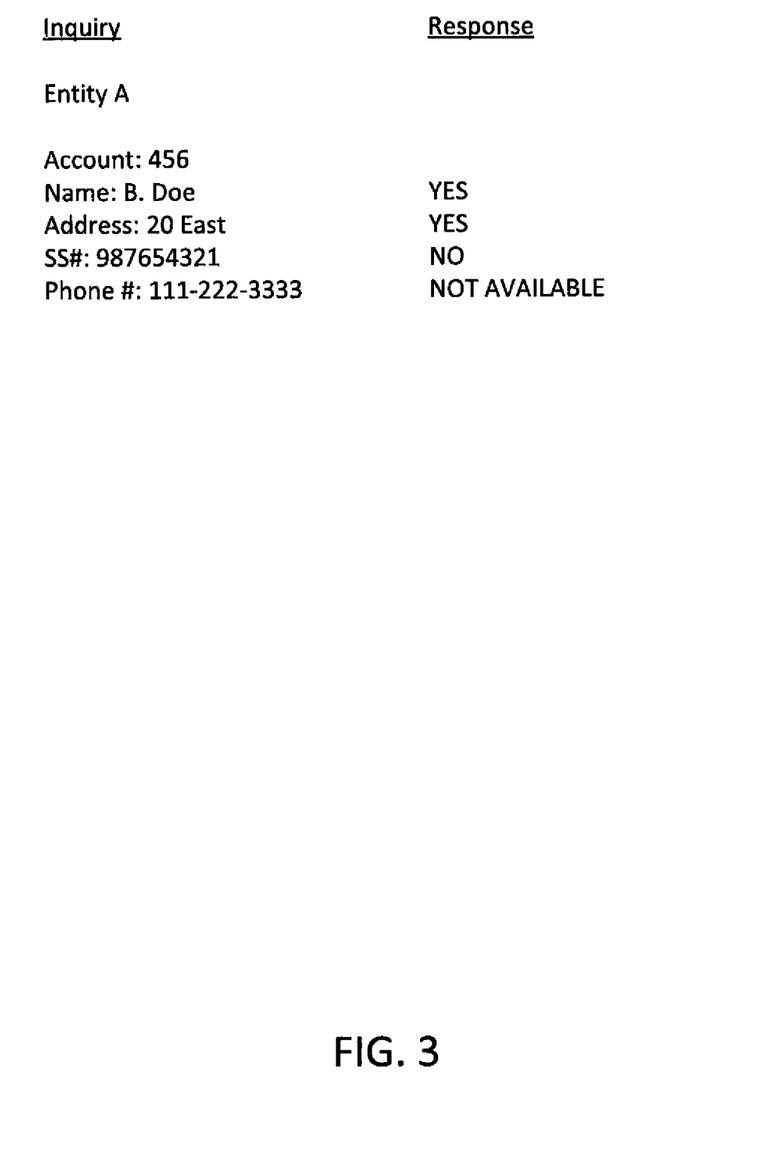
FIG. 3 is a table showing an example of an inquiry to the authentication database according to an embodiment.

Referring to FIGS. 1-3, an authentication database, generally designated 10, and a method of populating such database in accordance with the present invention is shown. The database 10 provides authentication of specific information upon inquiry and is designed to be contributed to and updated on a regular basis.

The database 10 is populated by collecting member data elements 16 from various contributing or member data sources 12. The member data sources 12 can be any suitable data source which have agreed to continually and automatically provide current, accurate information related to identifier 14, in a predetermined quantity and format, to the database 10 with which to populate the database 10. The member data sources 12 can be operated or managed by any agencies, entities, or data sources which have the ability to provide accurate data on a regular basis.

The member elements 16 provided by the member data sources 12 include information which corresponds to the individual identifier 14 held and/or maintained by that member data source 12. A data element 16 is thus a piece of information associated with an individual identifier 14 and which helps identify the owner of that identifier and/or another data element of that individual identifier 14. Generally, a member data element 16 for an identifier may be any categorized information associated with a particular identifier. For example, possible categories of data elements include names, addresses, dates of birth, identification/drivers' license numbers, social security numbers, tax i.d. numbers, account type, channel origination and other type of data associated with the identifier.

The authentication database 10 is populated in part by extracting and collecting data elements 16 associated with one or more individual identifier 14 from one or more member data sources 12. The data elements 16 from a single member data source 12 may be related to one or more individual identifier 14. That is, a member data source 12 may populate the database 10 with data elements 16 from a single identifier or with data elements 16 from multiple identifiers. The various types of identifiers are discussed in more detail in U.S. patent application Ser. No. 10/773,642 entitled "Account-owner Verification Database" and filed on Feb. 6, 2004, the entire contents of which is hereby incorporated by reference herein for all purposes.

The authentication database 10 according to the present invention also collects and stores non-member data elements 36 corresponding to non-member identifiers 34 held by non-member data sources 32. A non-member data source 32 is an entity capable of supplying information, but which is not capable of nor obligated to provide the information to the authentication database 10 on a regular and/or automatic basis. Additionally, the information provided by a non-member data source 32 need not be accurate. For example, non-member data sources 32 may have access to identifier information which is obtained from negative (as opposed to positive) populated databases, thereby containing information which, for example, may be triggered by only "bad events" or which is otherwise less than current. Therefore, non-member data elements 36 may be collected from a variety of sources and are not necessarily accurate or current.

One example of a non-member data source 32 is a social media service. Using such a system, non-member data elements 36 may be obtained by extracting identifier information from the social media accounts. Other non-member data sources 32, and therefore sources of non-member data elements 36, include, for example, Internet account openings, television services, video services, and other similar services. Each of these services contains at least non-member data elements 36 which, if collected and stored in the database 10, adds to the robustness of the database 10. For example, non-member data elements 36 may be obtained in the form of social media user accounts.

Additionally, in place of or in addition to non-member data elements 36 comprising raw account information gathered from non-member data sources 32, the database 10 may also be populated with non-member data elements 36 which are based on statistically accurate or analyzed information from non-member data sources 32, thereby adding an additional level of accuracy to the non-member data elements stored in the database 10. The member data elements 16 need not be exclusively obtained through the automatic population scheme discussed above, but may also be obtained from the sources noted here for obtaining non-member data elements 36. Furthermore, a non-member data source 32 may transition to become a member data source 12, assuming that all of the necessary accuracy and updating requirements are satisfied.

The authentication database 10 preferably includes a plurality of data element fields 20. In the preferred embodiment, the available data element fields include: identification number, sub-identification number, names, addresses, dates of birth, identification/drivers' license numbers, social security numbers, tax i.d. numbers, account type, channel origination, and other various data associated with accounts. Each of the data element fields 20 preferably contains a corresponding member or non-member data element 16, 36 obtained from a member or non-member data source 12, 32, respectively, as discussed above. Thus, for example, a data element (e.g., account information) which is denoted as "driver's license number" obtained from a member or non-member institution 12, 32 would be stored in the database 10 in the data element field 20 labeled "driver's license number".

For each new or updated account from a member data source 12, the member data source 12 is required to provide sufficient member data elements 16 to fill a minimum set of data element fields 20. In the preferred embodiment, the minimum required data element fields 20 can include: identification number, sub-identification number, one name, one address and one social security or tax i.d. number. Other member data elements 16 sufficient to populate less vital data element fields 20 may also be sent by the member data source 12.

The minimum set of data element fields supplied by a member data source 12 need not be the specific fields noted above, but rather may be adjusted according to the particular authentication application. Additionally, since non-member data sources 32 may not have a wide array of account information, not all of the available data element fields 20 in the authentication database 10 which are populated with member data elements 16 are collectable for identifiers related to non-member data sources 32. For example non-member data elements 36 provided through non-member data sources 32 such as social media services may not have sufficient information to populate all of the available data element fields 20 (and perhaps even the minimum set of data element fields) in the authentication database 10. Accordingly, the database 10 may not include a full complement of non-member data elements 36 for a given identifier 22. Additionally, since the non-member data elements 36 are often not as reliable nor complete as member data elements 16, an identifier 22 which includes data element fields 20 which are populated with non-member data elements 36, are noted in the database 10 as containing data elements from non-member data sources 32.

Since a primary goal of the authentication database 10 is to determine if a person is authenticated to access an account associated with an identifier, the database 10 is preferably structured such that the data element fields 20 are arranged in the database 10 according to corresponding identification number 22. Since multiple member and/or non-member data sources 12, 32 may have the same identifier 22, the individual identifiers 22 are preferably arranged within the database 10 according to sub identifiers 24.

However, the database 10 may be structured or organized according to other schemes without departing from the spirit and scope of the present invention, so long as the individual data element fields 20 are searchable to find the relevant data elements 16, 36 to help authenticate access to an account based on an identifier.

Preferably, the database 10 is initially populated by the member data sources 12 with a single file including all of the required member data elements 16 for all of the identifiers in the member data source 12. However, once the database 10 has been initially populated, the member data elements 16 in the database are preferably updated with new information associated with identifier(s) at the member data source 12 based on newly opened and/or recently maintained or modified accounts. More specifically, the database 10 is refreshed or updated with member data elements 16 associated with accounts at member data sources 12 which have been recently opened, closed, changed in status or which have incurred changes to one or more of their own data elements. Preferably, the collected data elements in the database 10 are stored and updated at regular intervals. Such automatic and continuous updating of the database 10 provides an inquirer with a very robust authentication tool. The database is also preferably updated in less frequent intervals with new and/or updated non-member data elements 36 obtained from non-member data sources 32.

The population and inquiry of the authentication database 10 will be explained through the following example, in conjunction with FIGS. 2 and 3. As shown in FIG. 2, the sample populated authentication database 10 contains five different identifier entries.

Non-member data elements 36 for identifiers 789 and 432 were obtained from a non-member data source 32, as denoted in the last data element field 20. Thus, not all of the required data element fields 20 for those entries are populated.

To submit an inquiry to the authentication database 10, an inquirer must, at the very least, provide an identifier 22 and at least one other data element (purportedly corresponding to that identifier) for verification. In cases where the database 10 is also organized according to sub-identification, the inquirer should also provide the Sub-ID 24 which corresponds to the designated identifier 22. The inquirer may enter an identifier and multiple data elements to be verified at once. Assuming that the requested identifier is in the database 10, the entered data elements are queried against the information stored in the corresponding data element field(s) 20 associated with the entered identifier 22. The database 10 returns a verification of each individual submitted data element corresponding to that identifier. For each data element in an inquiry, a response of "yes," "no" or "information not available" is returned to the inquirer, respectively. A positive, or "yes" response is received if the entered data element matches the content of the corresponding data element field 20 in the database 10 for the entered identifier. Similarly, a negative, or "no" response is returned to the inquirer if the entered data element does not match the content of the corresponding data element field 20 in the database 10 for the entered identifier. An "information not available" response is received if the data element field 20 in the database 10 corresponding to the entered data element is empty. The complete response received by the inquirer may contain one or more of each of the possible responses. That is, the database 10 responds according to each individual entered data element, respectively. Thus, to obtain a "positive" response, it is not required that all of the entered data elements match the contents of their corresponding data element fields for the entered identifier.

Preferably, no customer-specific data is provided back to the inquirer. Rather, the database only confirms or denies the accuracy of the information as entered into the data element field which corresponds to the entered identifier. An example (based on the database 10 of FIG. 2) of an inquiry and response corresponding to that inquiry according to the present invention is shown in FIG. 3.

Additionally, if an inquiry regarding a particular identifier results in a "NO" response on at least one data element in an inquiry, the database reports to the member data source 12 for that identifier that there was an inquiry against one of their identifiers/accounts which resulted in a negative response, along with the data element(s) that produced that negative response. In the example of FIG. 3, a report to Entity A would be generated that an inquiry was made against identifier #456 which produced a negative response for identified SS#.

The database 10 provides inquiry capabilities allowing inquirers to validate information about an identifier holder, in addition to the identifier's current status. The inquiry submitted to the database 10 may be made on-line, in real time or in a batch-process. Thus, the inquirer could be a major entity or a small business. The authentication database 10 is particularly advantageous for "faceless" exchanges where the identity of the identifier holder cannot be verified. Additionally, an inquirer can determine the status and relevant identifier holder information about an identifier in real time, such that business exchanges are not delayed, while still ensuring authenticity.

The authentication database 10 is positively, or actively, populated using information that is collected from actual member data sources 12 based on current information. This is an advantage over existing similar databases and authentication systems which utilize negative, or passive, data based on information which is retained based on accounts which are known to be faulty, fraudulent or otherwise troublesome. Negatively populated databases generally contain information for which there has been a recorded or reported problem. Since the database 10 according to the present invention utilizes a positively populated database where data elements are obtained from member data sources 12, the status and validation of member data elements which are returned to the inquirer are both current and timely, as opposed to being based simply on negative databases which are not populated in a standardized manner. Furthermore, since the database 10 also integrates information from non-member data sources 32, the database 10 according to the present invention includes an added level of robustness, thereby providing additional authentication accuracy to an inquirer.

Figure 4:
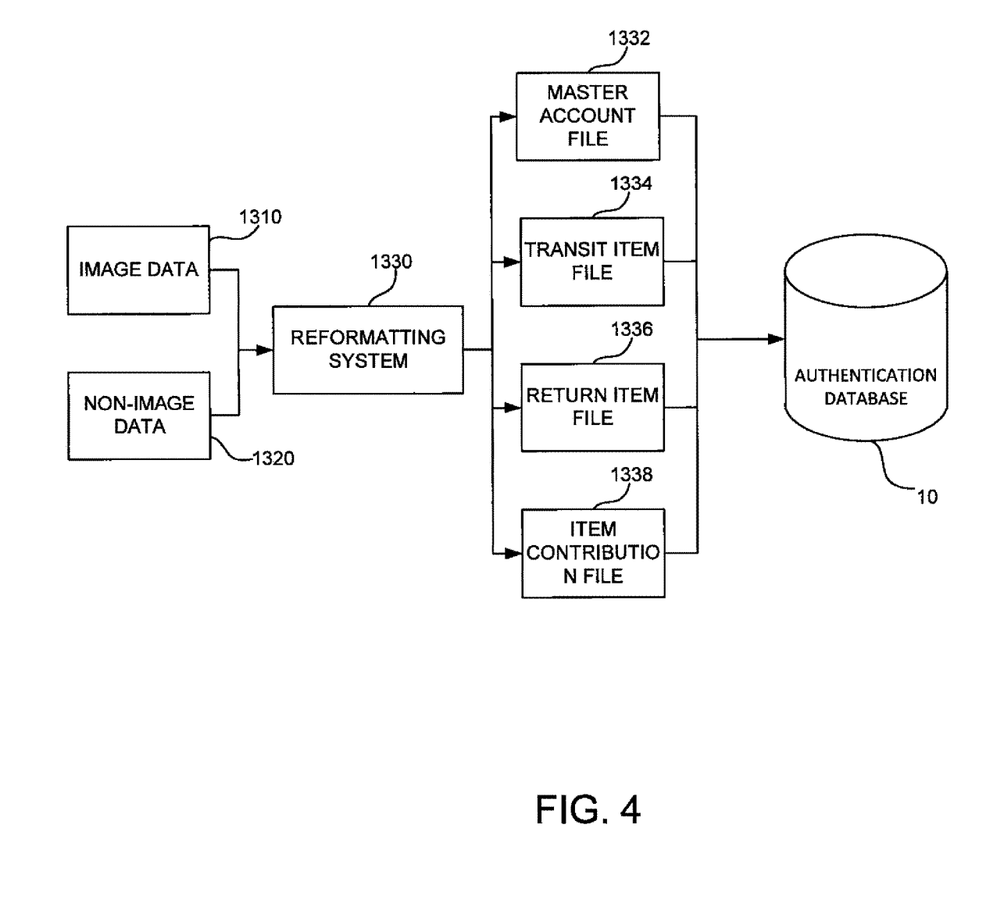
FIG. 4 illustrates an exemplary block diagram of a system for receiving, formatting, and populating an authentication database.

FIG. 4 illustrates a system for reformatting data from multiple data sources, wherein the received files can be image data files 1310 and non-image data files 1320. The image data files 1310 will typically be sent as files from standard data sourcing image systems, e.g., formatted in accordance with industry standards. The data files 1320 have relevant data to an identifier, but the formatting of that data may be variable depending on the data source that is sending it. The reformatting system 1330 can extract the data, identify a type of encryption, decrypt the data based on the identified encryption, reformat the data to be compatible with authentication database 10, encrypt the data to be compatible with authentication database 10, and filter any unnecessary data that does not correspond to a data element field in the authentication database.

As seen in FIG. 4, a reformatting system 1330 is maintained at the entity receiving the files, and reformats the incoming data into four different file types 1332, 1334, 1336 and 1338. The master account file (MAF) 1332 has data pertaining to the account that is involved with each transit item and incoming return, the transit item file (TIF) 1334 has data relevant only to transit items, the return item file 1336 has data relevant only to return items, and the item contribution file (ICF) 1338 has data relevant to both transit items and return items. Separating the data and reformatting it as shown permits the various data files to be stored and processed compatibly in authentication database 10. When needed to be tied together (e.g., specific account information from an MAF file needs to be pulled in order to consider a risk associated with a transit item), file IDs resident at each the different file types may be used to locate the relevant file record.

Figure 5:
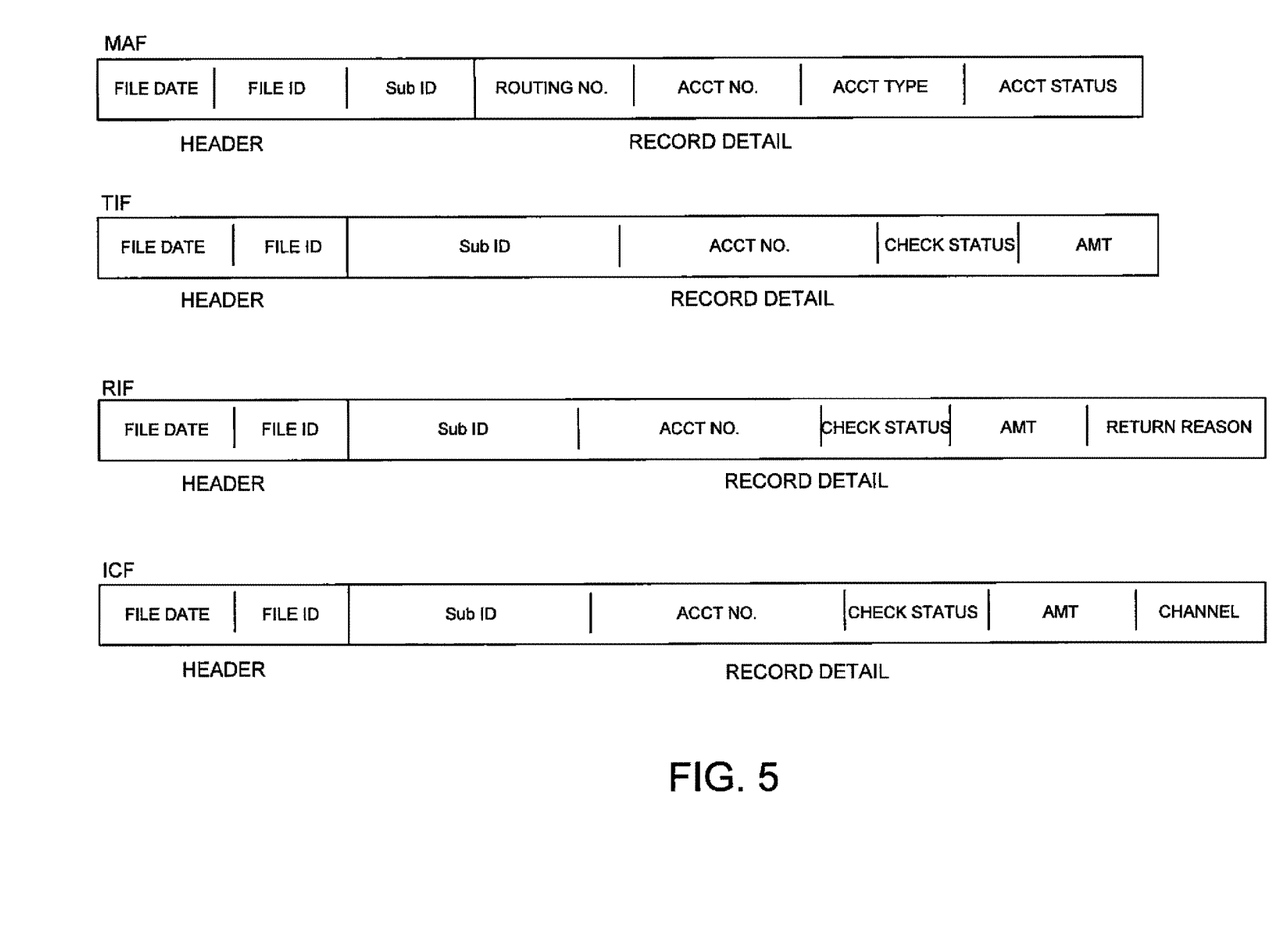
FIG. 5 illustrates exemplary file types into which transit item and incoming return data is reformatted.

FIG. 5 illustrates the four different file types MAF, TIF, RIF and ICF. For ease of description, the most relevant data fields in the header and record detail for each file type is shown (e.g., control bits in the header are omitted). Thus, the master account (MAF) file 1332 includes fields having a file date, a file ID, and a data source ID in the header, and having a data Sub identifier, account number, account type an account status associated with a specific account in the record detail. The transit item (TIF) file 1334 includes fields having a file date and file ID in the header, and a Sub ID, an account number, a check status, and a an amount in the record detail. The return item (RIF) file 1336 includes fields having a file date and file ID in the header, and a Sub ID, an account number, a check Status, an amount, and a return reason (code) in the record detail fields. Thus when accessing the various files, the identifiers and sub identifiers can be used to verify various details about the given account.

A primary benefit of the above described authentication database and associated population and inquiry schemes is that inquirers may determine authentication for access to the presented account or identifier. Such a feature is particularly advantageous in non face-to-face exchanges, such as telephone and Internet exchanges, to provide a method to authenticate the other user in the exchange.

Figure 6:
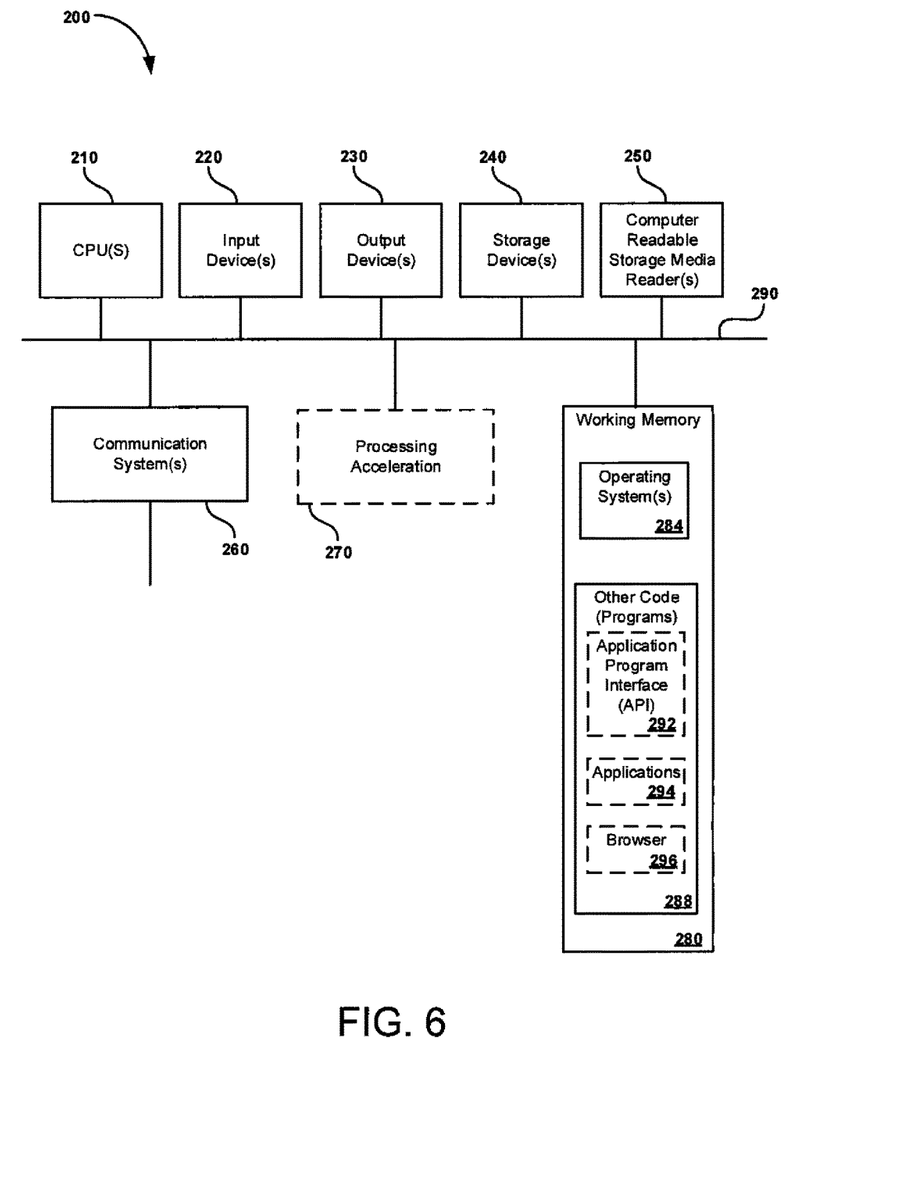
FIG. 6 illustrates a block diagram of a computer system according to an embodiment.

FIG. 6 is a block diagram illustrating an exemplary computer system upon which embodiments of the present invention may be implemented. This example illustrates a computer system 200 such as may be used, in whole, in part, or with various modifications, to provide the functions of the computers that provide data to and populate the authentication database, as well as other components and functions of the invention described herein.

The computer system 200 is shown comprising hardware elements that can be electrically coupled or otherwise in communication via a bus 290. The hardware elements can include one or more processors 210, including, without limitation, one or more general-purpose processors and/or one or more special-purpose processors (such as digital signal processing chips, graphics acceleration chips, and/or the like); one or more input devices 220, which can include, without limitation, a mouse, a keyboard and/or the like; and one or more output devices 230, which can include, without limitation, a display device, a printer and/or the like.

The computer system 200 may further include one or more storage devices 240, which can comprise, without limitation, local and/or network accessible storage or memory systems having computer or machine readable media. Common forms of physical and/or tangible computer readable media include, as examples, a floppy disk, a flexible disk, hard disk, magnetic tape, or any other magnetic medium, an optical medium (such as CD-ROM), a random access memory (RAM), a read only memory (ROM) which can be programmable or flash-updateable or the like, and any other memory chip, cartridge, or medium from which a computer can read data, instructions and/or code. In many embodiments, the computer system 200 will further comprise a working memory 280, which could include (but is not limited to) a RAM or ROM device, as described above.

The computer system 200 also may further include a communications subsystem 260, such as (without limitation) a modem, a network card (wireless or wired), an infra-red communication device, or a wireless communication device and/or chipset, such as a Bluetooth® device, an 802.11 device, a WiFi device, a near field communications (NFC) device, cellular communication facilities, etc. The communications subsystem 260 may permit data to be exchanged with a network, and/or any other devices described herein. Transmission media used by communications subsystem 260 (and the bus 290) may include copper wire, coaxial cables and fiber optics. Hence, transmission media can also take the form of waves (including, without limitation radio, acoustic and/or light waves, such as those generated during radio-wave and infra-red data communications).

The computer system 200 can also comprise software elements, illustrated within the working memory 280, including an operating system 284 and/or other code 288, such as one or more application programs 294, which may be designed to implement, as an example, the processes involved in FIGS. 1-5, and thus provide specially designed and programmed systems (rather than well-understood, routine and conventional activities and systems in the prior art) for carrying out the unique elements of those processes and novel features described herein. The other code 288 can further include an application program interface (API) 292 for interfacing with applications 294. Additionally, a browser 296 for accessing the Internet can be included in other code 288. Optionally, computer system 200 can include a processing acceleration 270 that can cause the processors 210 to accelerate and offer faster processing times.

As an example, one or more methods discussed earlier might be implemented as code and/or instructions executable by a computer (and/or a processor within a computer). In some cases, a set of these instructions and/or code might be stored on a computer readable storage medium that is part of the system 200, such as the storage device(s) 240. In other embodiments, the storage medium might be separate from a computer system (e.g., a removable medium, such as a compact disc, etc.), and/or provided in an installation package with the instructions/code stored thereon. These instructions might take the form of code which is executable by the computer system 200 and/or might take the form of source and/or installable code, which is compiled and/or installed on the computer system 200 (e.g., using any of a variety of generally available compilers, installation programs, compression/decompression utilities, etc.). The communications subsystem 260 (and/or components thereof) generally will receive the signals (and/or the data, instructions, etc., carried by the signals), and the bus 290 then might carry those signals to the working memory 280, from which the processor(s) 210 retrieves and executes the instructions. The instructions received by the working memory 280 may optionally be stored on storage device 240 either before or after execution by the processor(s) 210.

Moreover, while the various flows and processes described herein (e.g., those involved in FIGS. 1-5) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of authenticating account owners, the method comprising:
   receiving, at a database server, a plurality of participant files, wherein the plurality of participant files comprising at least one participant file from each of plurality of participant data sources, wherein, the plurality of participant files from the plurality of participant data sources containing current and accurate information of the account owners:
   each participant file of the plurality of participant files comprises two or more participant data elements,
   each participant data element of the two or more participant data elements comprises participant data values including a participant account identifier that corresponds to one of a plurality of participant accounts maintained for one of the account owners and including participant account owner details that correspond to personally identifiable information about a corresponding account owner, and
   each participant data element of the two or more participant data elements in a particular participant file from a particular participant data source corresponding to a participant account maintained by the particular participant data source;
   extracting, at the database server, the participant data values from the two or more participant data elements from each of the plurality of participant files;

storing, by the database server, the participant data values extracted from the two or more participant data elements from each of the plurality of participant files in an account owner authentication database, wherein the account owner authentication database comprises a plurality of data element fields, and wherein each of the participant data values extracted corresponds to one of the plurality of data element fields;

periodically and automatically receiving, by the database server, a plurality of updated participant files, wherein the plurality of updated participants files comprising at least one updated participant file from each of the plurality of participant data sources, each updated participant file comprising at least one updated participant data element from a plurality of updated participant data elements;

in response to receiving the plurality of updated participant files, refreshing, by the database server, the account owner authentication database with the plurality of updated participant data elements;

wherein each updated participant file of the plurality of updated participant files is provided in a predetermined format to the database server on a predetermined schedule, the method further comprising:

receiving at the database server, a plurality of non-participant files, the plurality of non-participant files comprising at least one non-participant file from each of a plurality of non-participant data sources, wherein, the plurality of non-participant files from the plurality of non-participant data sources containing information that are not current and accurate about the account owners:

each non-participant file of the plurality of non-participant files comprises two or more non-participant data elements, each of the two or more non-participant data elements comprises non-participant data values including a non-participant account identifier that corresponds to one of a plurality of non-participant accounts maintained for one of the account owners and including non-participant account owner details that correspond to personally identifiable information about a corresponding account owner, and each of the two or more non-participant data elements in a particular non-participant file from a particular non-participant data source corresponding to a particular non-participant account maintained by the particular non-participant data source;

extracting, at the database server, the non-participant data values from the two or more non-participant data elements from each of the plurality of non-participant files;

storing, by the database server, the non-participant data values extracted from the two or more non-participant data elements from each of the plurality of non-participant files in the account owner authentication database, wherein each of the non-participant data values extracted corresponds to one of the plurality of data element fields, wherein the plurality of data element fields comprises a non-participant flag field, and wherein each non-participant data element comprises a row in a table of the account owner authentication database having an indicator in the non-participant flag field, sporadically receiving, by the database server, at least one updated non-participant file from at least one non-participant data source, the at least one updated non-participant file comprising at least one updated non-participant data element, wherein the at least one updated non-participant data element is not provided in the predetermined format;

in response to receiving the at least one updated non-participant file, refreshing, by the database server, the account owner authentication database with the at least one updated non-participant data element;

receiving, at the database server a request for authentication of an account owner from an inquirer, the request comprising at least an account identifier and a data value;

in response to receiving the request, searching the account owner authentication database to determine whether a match is found for the account identifier and the data value received;

upon a match is found for both the account identifier and the data value, transmitting a response to the inquirer indicating a match is determined;

upon a match is not found for at least one of the account identifier and the data value, transmitting a response to the inquirer indicating a match is not determined; and wherein the responses do not provide any account owner-specific data to the inquirer.

2. The method of authenticating account owners of claim 1, wherein the plurality of data element fields comprise an account number field, an account type field, and an account holder name field.

3. The method of authenticating account owners of claim 1, wherein each of the plurality of participant data sources is required to provide a set of participant data elements corresponding to a predefined set of data element fields for each participant account identifier.

4. The method of authenticating account owners of claim 3, wherein each of the plurality of non-participant data sources is not required to provide a set of non-participant data elements corresponding to the predefined set of data element fields for each non-participant account identifier.

5. The method of authenticating account owners of claim 1, wherein a first non-participant data source of the plurality of non-participant data sources provides non-participant data elements from a plurality of check images corresponding to a plurality of checks, wherein each check of the plurality of checks comprises non-participant data elements corresponding to non-participant account identifiers.

6. The method of authenticating account owners of claim 1, further comprising: organizing the account owner authentication database according to the plurality of participant accounts and the plurality of non-participant accounts, wherein each of the participant accounts and non-participant accounts correspond to an account number.

7. The method of authenticating account owners of claim 6, wherein each of the plurality of participant accounts and non-participant accounts has an associated routing transit number, and wherein organizing the account owner authentication database is further according to the associated routing transit number.

8. The method of authenticating account owners of claim 1, further comprising: when the account identifier matches with a first participant account of the plurality of participant accounts, and the data value does not match with any participant data value stored in the account owner authentication database, transmitting a notice to a corresponding participant data source that provided the first participant account which matches the account identifier, the notice indicating that an inquiry of the first participant account resulted in no match.

9. A system for authenticating account owners, the system comprising:
  one or more processors; and
  a memory communicatively coupled with and readable by the one or more processors and having stored therein processor-readable instructions which, when executed by the one or more processors, cause the one or more processors to:
  receive a plurality of participant files, wherein the plurality of participant files comprising at least one participant file from each of a plurality of participant data sources, wherein, the plurality of participant files from the plurality of participant data sources containing current and accurate information of the account owners:
    each participant file of the plurality of participant files comprises two or more participant data elements,
    each participant data element of the two or more participant data elements comprises participant data values including a participant account identifier that corresponds to one of a plurality of participant accounts maintained for one of the account owners and including participant account owner details that correspond to personally identifiable information about a corresponding account owner, and
    each participant data element of the two or more participant data elements in a particular participant file from a particular participant data source corresponding to a participant account maintained by the particular participant data source;
  extract the participant data values from the two or more participant data elements from each of the plurality of participant files;
  store the participant data values extracted from the two or more participant data elements from each of the plurality of participant files in an account owner authentication database, wherein the account owner authentication database comprises a plurality of data element fields, and wherein each of the participant data values extracted corresponds to one of the plurality of data element fields;
  periodically and automatically receive a plurality of updated participant files, wherein the plurality of updated participants files comprising at least one updated participant file from each of the plurality of participant data sources, each updated participant file comprising at least one updated participant data element from a plurality of updated participant data elements;
  in response to receiving the plurality of updated participant files, refresh the account owner authentication database with the plurality of updated participant data elements;
  wherein each updated participant file of the plurality of updated participant files is provided in a predetermined format to a database server on a predetermined schedule, and wherein the processor-readable instructions further cause the one or more processors to:
  receive a plurality of non-participant files, the plurality of non-participant files comprising at least one non-participant file from each of a plurality of non-participant data sources, wherein, the plurality of non-participant files from the plurality of non-participant data sources containing information that are not current and accurate about the account owners:
    each non-participant file of the plurality of non-participant files comprises two or more non-participant data elements,
    each of the two or more non-participant data elements comprises non-participant data values including a non-participant account identifier that corresponds to one of a plurality of non-participant accounts maintained for one of the account owners and including non-participant account owner details that correspond to personally identifiable information about a corresponding account owner, and
    each of the two or more non-participant data elements in a particular non-participant file from a particular non-participant data source corresponding to a particular non-participant account maintained by the particular non-participant data source;
  extract the non-participant data values from the two or more non-participant data elements from each of the plurality of non-participant files;
  store the non-participant data values extracted from the two or more non-participant data elements from each of the plurality of non-participant files in the account owner authentication database, wherein each of the non-participant data values extracted corresponds to one of the plurality of data element fields, wherein the plurality of data element fields comprises a non-participant flag field, and wherein each non-participant data element comprises a row in a table of the account owner authentication database having an indicator in the non-participant flag field,
  irregularly receive at least one updated non-participant file from at least one non-participant data source, the at least one updated non-participant file comprising at least one updated non-participant data element, wherein the at least one updated non-participant data element is not provided in the predetermined format;
  in response to receiving the at least one updated non-participant file, refreshing, by the database server, the account owner authentication database with the at least one updated non-participant data element;
  receive a request for authentication of an account owner from an inquirer, the request comprising at least an account identifier and a data value;
  in response to receiving the request, searching the account owner authentication database to determine whether a match is found for the account identifier and the data value received;
  upon a match is found for both the account identifier and the data value, transmitting a response to the inquirer indicating a match is determined;
  upon a match is not found for at least one of the account identifier and the data value, transmitting a response to the inquirer indicating a match is not determined; and
  wherein the responses do not provide any account owner-specific data to the inquirer.

10. The system for authenticating account owners of claim 9, wherein each of the plurality of participant data sources is required to provide a set of participant data elements corresponding to a predefined set of data element fields for each participant account identifier.

11. The system for authenticating account owners of claim 9, wherein each of the plurality of participant data sources is required to provide a set of participant data elements corresponding to a predefined set of data element fields for each participant account identifier, and wherein each of the plurality of non-participant data sources are not required to provide a set of non-participant data elements corresponding to the predefined set of data element fields for each non-participant account identifier.

12. A computer-readable memory device having stored thereon processor-readable instructions which, when executed by one or more processors, cause the one or more processors to:

receive a plurality of participant files, wherein the plurality of participant files comprising at least one participant file from each of a plurality of participant data sources, wherein, the plurality of participant files from the plurality of participant data sources containing current and accurate information of account owners:
- each participant file of the plurality of participant files comprises two or more participant data elements,
- each participant data element of the two or more participant data elements comprises participant data values including a participant account identifier that corresponds to one of a plurality of participant accounts maintained for one of the account owners and including participant account owner details that correspond to personally identifiable information about a corresponding account owner, and
- each participant data element of the two or more participant data elements in a particular participant file from a particular participant data source corresponding to a participant account maintained by the particular participant data source;

extract the participant data values from the two or more participant data elements from each of the plurality of participant files;

store the participant data values extracted from the two or more participant data elements from each of the plurality of participant files in an account owner authentication database, wherein the account owner authentication database comprises a plurality of data element fields, and wherein each of the participant data values extracted corresponds to one of the plurality of data element fields;

periodically and automatically receive a plurality of updated participant files, wherein the plurality of updated participants files comprising at least one updated participant file from each of the plurality of participant data sources, each updated participant file comprising at least one updated participant data element from a plurality of updated participant data elements;

in response to receiving the plurality of updated participant files, refresh the account owner authentication database with the plurality of updated participant data elements;

wherein each updated participant file of the plurality of updated participant files is provided in a predetermined format to a database server on a predetermined schedule, and wherein the processor-readable instructions further cause the one or more processors to:

receive a plurality of non-participant files, the plurality of non-participant files comprising at least one non-participant file from each of a plurality of non-participant data sources, wherein, the plurality of non-participant files from the plurality of non-participant data sources containing information that are not current and accurate about the account owners:
- each non-participant file of the plurality of non-participant files comprises two or more non-participant data elements,
- each of the two or more non-participant data elements comprises non-participant data values including a non-participant account identifier that corresponds to one of a plurality of non-participant accounts maintained for one of the account owners and including non-participant account owner details that correspond to personally identifiable information about a corresponding account owner, and
- each of the two or more non-participant data elements in a particular non-participant file from a particular non-participant data source corresponding to a particular non-participant account maintained by the particular non-participant data source;

extract the non-participant data values from the two or more non-participant data elements from each of the plurality of non-participant files;

store the non-participant data values extracted from the two or more non-participant data elements from each of the plurality of non-participant files in the account owner authentication database, wherein each of the non-participant data values extracted corresponds to one of the plurality of data element fields, wherein the plurality of data element fields comprises a non-participant flag field, and wherein each non-participant data element comprises a row in a table of the account owner authentication database having an indicator in the non-participant flag field, irregularly receive at least one updated non-participant file from at least one non-participant data source, the at least one updated non-participant file comprising at least one updated non-participant data element, wherein the at least one updated non-participant data element is not provided in the predetermined format;

in response to receiving the at least one updated non-participant file, refreshing, by the database server, the account owner authentication database with the at least one updated non-participant data element;

receive a request for authentication of an account owner from an inquirer, the request comprising at least an account identifier and a data value;

in response to receiving the request, searching the account owner authentication database to determine whether a match is found for the account identifier and the data value received;

upon a match is found for both the account identifier and the data value, transmitting a response to the inquirer indicating a match is determined;

upon a match is not found for at least one of the account identifier and the data value, transmitting a response to the inquirer indicating a match is not determined; and wherein the responses do not provide any account owner-specific data to the inquirer.

13. The computer-readable memory device of claim 12, wherein each of the plurality of participant data sources are required to provide a set of participant data elements corresponding to a predefined set of data element fields for each participant account identifier, and wherein each of the plurality of non-participant data sources are not required to provide a set of non-participant data elements corresponding to the predefined set of data element fields for each non-participant account identifier.

* * * * *

UNITED STATES PATENT AND TRADEMARK OFFICE
CERTIFICATE OF CORRECTION

PATENT NO.        : 10,346,620 B2
APPLICATION NO.   : 15/840978
DATED             : July 9, 2019
INVENTOR(S)       : Glen Sgambati, Robert Perrotta and Rich Mayo

Page 1 of 1

It is certified that error appears in the above-identified patent and that said Letters Patent is hereby corrected as shown below:

On the Title Page

Item (73), Assignee: replace "Service," with --Services,--

Signed and Sealed this
Fifth Day of May, 2020

Andrei Iancu
*Director of the United States Patent and Trademark Office*